(12) United States Patent
Park et al.

(10) Patent No.: US 11,620,944 B2
(45) Date of Patent: Apr. 4, 2023

(54) ORGANIC LIGHT EMITTING DIODE DISPLAY DEVICE

(71) Applicant: LG ELECTRONICS INC., Seoul (KR)

(72) Inventors: Seungkyu Park, Seoul (KR); Youngho Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/284,771

(22) PCT Filed: May 20, 2019

(86) PCT No.: PCT/KR2019/005971
§ 371 (c)(1),
(2) Date: Apr. 12, 2021

(87) PCT Pub. No.: WO2020/235698
PCT Pub. Date: Nov. 26, 2020

(65) Prior Publication Data
US 2021/0398485 A1 Dec. 23, 2021

(51) Int. Cl.
*G09G 3/3233* (2016.01)
*G01K 3/00* (2006.01)
*G05F 1/46* (2006.01)

(52) U.S. Cl.
CPC ........... *G09G 3/3233* (2013.01); *G01K 3/005* (2013.01); *G05F 1/463* (2013.01);
(Continued)

(58) Field of Classification Search
None
See application file for complete search history.

(56) References Cited

U.S. PATENT DOCUMENTS

| 8,704,463 B2 * | 4/2014 | Lin | ........................ H05B 45/56 |
| | | | 315/225 |
| 2012/0188287 A1 * | 7/2012 | Wurzel | .................. G06F 1/203 |
| | | | 345/690 |

(Continued)

FOREIGN PATENT DOCUMENTS

| KR | 1020110097049 | 8/2011 |
| KR | 1020140047836 | 4/2014 |

(Continued)

OTHER PUBLICATIONS

PCT International Application No. PCT/KR2019/005971, International Search Report dated Feb. 20, 2020, 3 pages.

*Primary Examiner* — Dorothy Harris
(74) *Attorney, Agent, or Firm* — Lee, Hong, Degerman, Kang & Waimey PC

(57) ABSTRACT

The present invention relates to an organic light emitting diode display device which minimizes a temperature increase of an organic light emitting panel in consideration of an input image and an external environment, the organic light emitting diode display device comprising: an organic light emitting panel; a power supply unit for supplying a current to the organic light emitting panel; a control unit for performing an automatic current limit for controlling the maximum value of the current supplied to the organic light emitting panel to be less than or equal to the current limit value; and a temperature sensor for sensing the temperature of the organic light emitting panel, wherein the control unit may change the current limit value according to the present temperature of the organic light emitting panel.

13 Claims, 12 Drawing Sheets

(52) U.S. Cl.
CPC ... *G09G 2320/041* (2013.01); *G09G 2330/02* (2013.01); *G09G 2330/021* (2013.01); *G09G 2330/026* (2013.01); *G09G 2354/00* (2013.01)

(56) References Cited

U.S. PATENT DOCUMENTS

| | | | | |
|---|---|---|---|---|
| 2014/0104259 A1* | 4/2014 | Oh | ............... | G09G 3/3266 |
| | | | | 345/212 |
| 2014/0375704 A1 | 12/2014 | Bi et al. | | |
| 2019/0088199 A1* | 3/2019 | Zhang | ............... | G09G 3/3233 |
| 2019/0096320 A1* | 3/2019 | Hwangbo | ............ | G09G 3/3208 |

FOREIGN PATENT DOCUMENTS

| | | |
|---|---|---|
| KR | 1020140082499 | 7/2014 |
| KR | 1020190035437 | 4/2019 |

\* cited by examiner

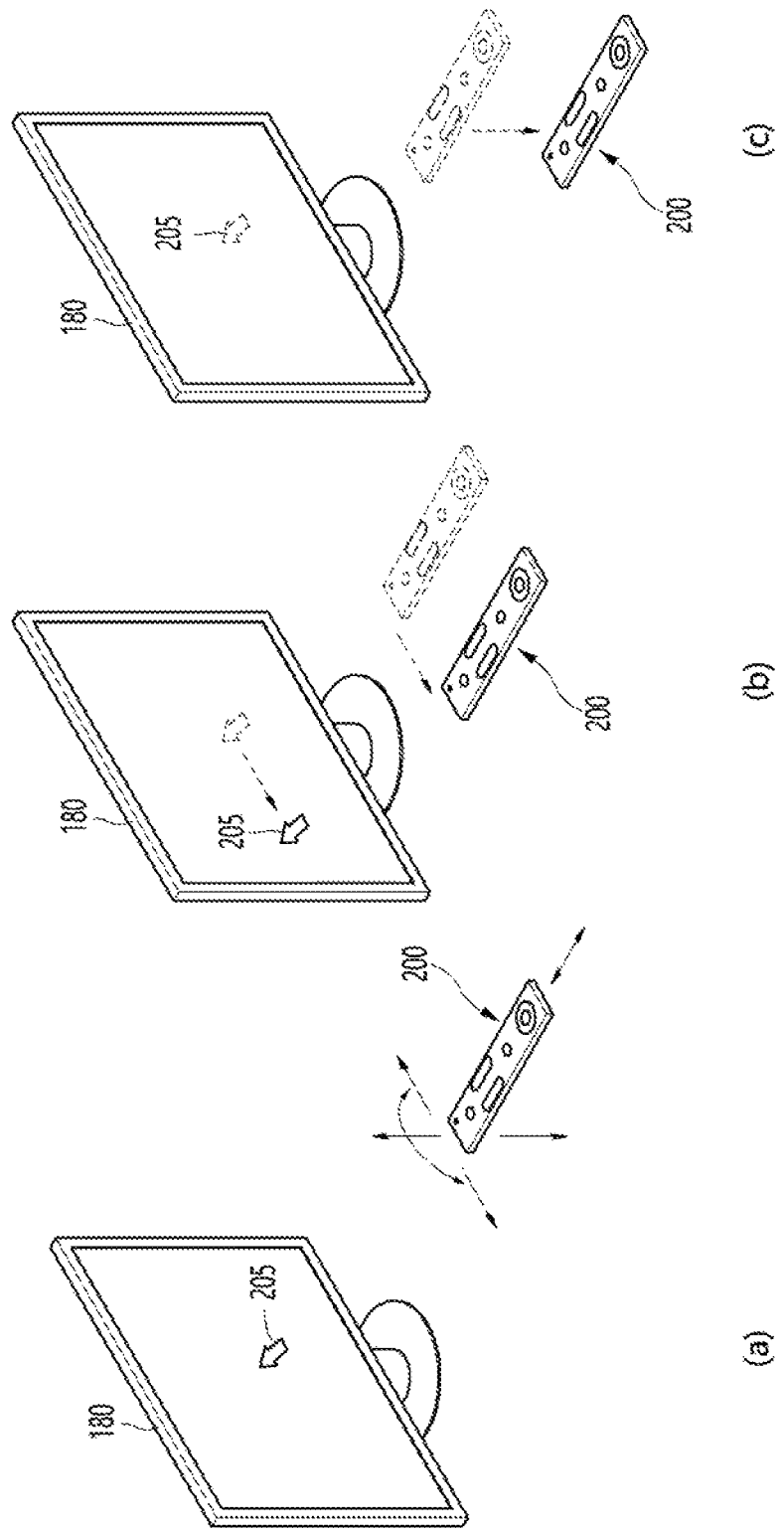

FIG. 8

|   | Initial temperature(T_I) | Current limit gain |
|---|---|---|
| A | 35°C < T_I | 0.85 |
| B | 30°C < T_I ≤ 35°C | 0.9 |
| C | 25°C < T_I ≤ 30°C | 0.95 |
| D | T_I ≤ 25°C | 1 |

ORGANIC LIGHT EMITTING DIODE DISPLAY DEVICE

CROSS-REFERENCE TO RELATED APPLICATIONS

This application is the National Stage filing under 35 U.S.C. 371 of International Application No. PCT/KR2019/005971, filed on May 20, 2019, the contents of which are all hereby incorporated by reference herein in their entirety.

TECHNICAL FIELD

The present disclosure relates to an organic light emitting diode display device, and more particularly, to an organic light emitting diode display device capable of minimizing a temperature increase of an organic light emitting diode panel.

BACKGROUND ART

In recent years, the types of display devices have been diversified. Among them, an organic light emitting diode (OLED) display device is widely used.

Since the OLED display device is a self-luminous device, the OLED display device has lower power consumption and can be made thinner than a liquid crystal display (LCD) requiring a backlight. In addition, the OLED display device has a wide viewing angle and a fast response time.

In a general OLED display device, red, green, and blue sub-pixels constitute one unit pixel and an image having various colors may be displayed through the three sub-pixels.

In detail, the OLED display device may display an image by supplying a current to at least one of sub-pixels, such as red, green, and blue sub-pixels. For example, the OLED display device may reproduce red for a relevant pixel by supplying a current to only the red sub-pixel and cutting off the supply of a current to the green and blue sub-pixels.

In addition, the OLED display device may reproduce secondary color, such as Yellow, Cyan, or Magenta, by supplying a current to two sub-pixels of the red, green, and blue sub-pixels.

Meanwhile, when the OLED display device continuously displays an image having the secondary color, a panel temperature may be excessively increased. In other words, the panel of the OLED display device may have a problem that a temperature is increased depending on an input image.

In addition, as the temperature of a surrounding place, in which the OLED display device is installed, is increased, the temperature of the panel may be more increased. For example, in general, the panel temperature of the OLED display device in the summer is higher than the panel temperature of the OLED display device in the winter.

In addition, since countries have different summer temperatures, and households have different environments (for example, an environment in which an air conditioner to discharge cold air is installed around the OLED display device or an environment in which heat is severely generated around the OLED display device) in which the OLED display device is installed, it may be difficult to predict an influence exerted on the panel by the external environment.

Accordingly, since the temperature of the panel of the OLED display device is increased due to the external environment as well as the input image, a quantity of current flowing through the panel is restricted depending on the external environment, thereby minimizing the temperature increase of the panel.

Hereinafter, according to the present disclosure, the external environment is predicted based on the sensed temperature of the panel in the state that the cooling time is ensured, thereby minimizing the temperature increase of the panel depending on the input image and the external environment, and the cooling time is disclosed in Korean Unexamined Patent Publication No. 10-2019-0035437.

DISCLOSURE

Technical Problem

The present disclosure is to provide an organic light emitting diode display device capable of minimizing the temperature increase of a panel.

The present disclosure is to provide an organic light emitting diode display device capable of minimizing an excessive temperature increase of a panel, based on a present temperature of the panel.

The present disclosure is to provide an organic light emitting diode display device capable of minimizing an excessive temperature increase of a panel, based on a present temperature of the panel and an external temperature depending on an external environment.

Technical Solution

An organic light emitting diode (OLED) display device according to an embodiment of this present disclosure comprising an OLED panel, a power supply configured to supply a current to the OLED panel, a controller configured to perform an automatic current limit function of controlling a maximum value of the current, which is supplied to the OLED panel, to be a current limit value or smaller, and a temperature sensor configured to sense a temperature of the OLED panel, wherein the controller is configured to change the current limit value depending on a present temperature of the OLED panel.

The controller is configured to change the current limit value, when the present temperature exceeds a set temperature.

The controller is configured to set the current limit value to a first current value, when the present temperature is equal to or lower than the set temperature, and set the current limit value to a current value smaller than the first current value, when the present temperature exceeds the set temperature.

The controller is configured to set the current limit value to a different value depending on a cooling temperature of the OLED panel, when the present temperature exceeds the set temperature, and wherein the cooling temperature includes a temperature of the OLED panel, which is sensed by the temperature sensor when the OLED display device is powered on after powered off for a specific time.

The controller is configured to set the current limit value to be smaller, as the cooling temperature is increased.

The controller is configured to acquire a cooling temperature of the OLED panel when power becomes in an on status, and change the current limit value to a different value depending on the cooling temperature, when changing the current limit value.

The controller is configured to set the current limit value to a first current, when the present temperature is equal to or lower than a set temperature, set the current limit value to a second current value smaller than the first current value, when the present temperature exceeds the set temperature and when the cooling temperature is equal to or lower than a first temperature, and set the current limit value to be a third current value smaller than the second current value, when the present temperature exceeds the set temperature and when the cooling temperature exceeds the first temperature.

The controller is configured to acquire, as the cooling temperature, a temperature of the OLED panel, which is sensed by the temperature sensor when a status of the power is changed to the on status from an off status.

The controller is configured to update the cooling temperature with a temperature of the OLED panel, which is sensed by the temperature sensor right after the status of the power is changed to the on status, when the status of the power is the off status for a specific time or more before the status of the power is the on status, and maintain the cooling temperature to a cooling temperature, which is previously obtained, when the status of the power is the off status for less than the specific time before the status of the power is changed to the on status.

The present temperature of the OLED panel includes an average temperature of the OLED panel, which is sensed by the temperature sensor for a predetermined time.

The controller is configured to acquire a current limit gain based on a cooling temperature of the OLED panel, and set the current limit value based on the current limit gain.

The controller is configured to change the current limit value to a current value smaller than a first current value based on the current limit gain, when the present temperature exceeds a set temperature, and re-change the current limit value to the first current value, when the present temperature is re-sensed to a temperature equal to or lower than the set temperature.

The controller is configured to maintain the current limit gain regardless of whether the current limit value is changed.

The OLED display device further comprising a user input interface configured to receive whether a current limit changing function is set, wherein the controller is configured to change the current limit value based on the present temperature of the OLED panel when the current limit changing function is turned on.

The controller is configured to fix the current limit value regardless of the present temperature, when the current limit changing function is turned off.

Advantageous Effects

According to an embodiment of the present disclosure, when the OLED panel is determined as being overheated, the current limit value is changed, thereby rapidly decreasing the temperature of the organic light emitting diode panel to correspond to a temperature change of the OLED panel in real time. Accordingly, the lifespan of the OLED panel may be increased.

The temperature of the cooled-down OLED panel may be recognized as being an external temperature. Accordingly, the additional temperature sensor to sense the external temperature is not required. Therefore, the structure may be simplified and the manufacturing costs may be reduced.

In addition, since the temperature of the OLED panel may be reduced based on the external temperature, the temperature of the OLED panel may be rapidly reduced depending on the current situation, thereby improving reliability.

Further, since the current limit value may be gradually reduced depending on the external temperature, the excessive brightness loss of the OLED panel may be minimized and the temperature of the OLED panel may be reduced to be matched with the external situation.

DESCRIPTION OF DRAWINGS

FIG. 4A is a diagram illustrating a method in which the remote controller in FIG. 2 performs control.

FIG. 8 is a view illustrating a look-up table in which an initial temperature of an OLED panel is mapped to a current limit gain according to an embodiment of the present disclosure.

BEST MODE

[Mode for Invention]

Hereinafter, the present disclosure will be described in detail with reference to the drawings.

The suffixes "module" and "unit" for components used in the description below are assigned or mixed in consideration of easiness in writing the specification and do not have distinctive meanings or roles by themselves.

Figure 1:
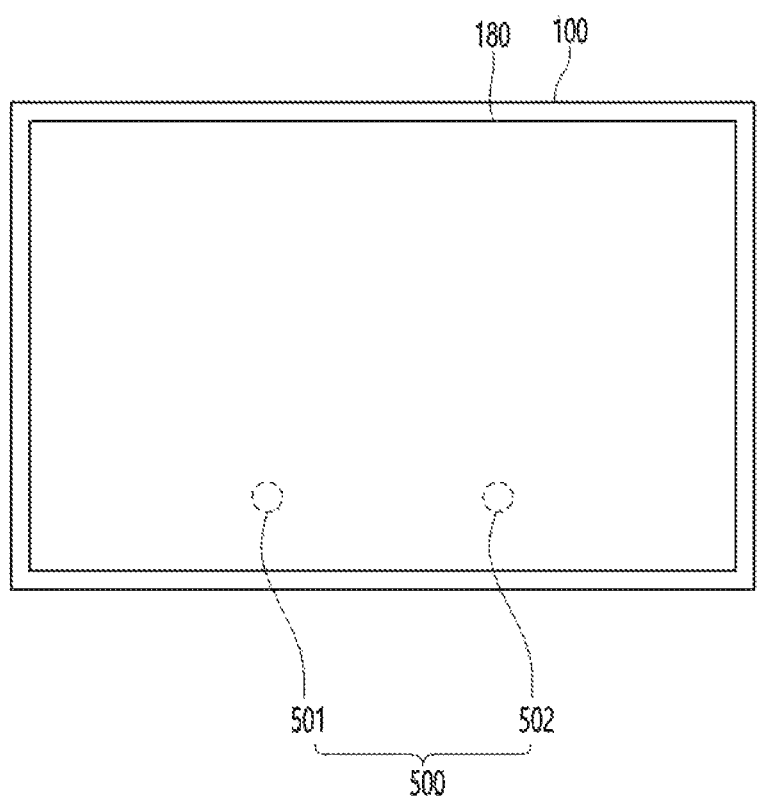
FIG. 1 is a diagram illustrating an image display apparatus according to an embodiment of the present disclosure.

FIG. 1 is a diagram illustrating an image display apparatus according to an embodiment of the present disclosure.

With reference to the drawings, an image display apparatus 100 includes a display 180.

On the other hand, the display 180 is realized by one among various panels. For example, the display 180 is one of the following panels: a liquid crystal display panel (LCD panel), an organic light-emitting diode (OLED) panel (OLED panel), and an inorganic light-emitting diode (OLED) panel (OLED panel).

According to the present disclosure, the display 180 is assumed to include an organic light-emitting diode (OLED) panel (OLED).

Hereinafter, the OLED display device may refer to the image display apparatus 100 including an OLED panel.

At least one temperature sensor 500 may be provided in the OLED panel, and may sense the temperature of the OLED panel.

According to an embodiment, a plurality of temperature sensors may be provided in the OLED panel. For example, the plurality of temperature sensors may include a first temperature sensor 501 and a second temperature sensor 502. In this case, the temperature sensed by the temperature sensor 500 may be an average temperature of the temperature sensed by the first temperature sensor 501 and the temperature sensed by the second temperature sensor 502, which is provided only for the illustrative purpose.

On the other hand, examples of the image display apparatus 100 in FIG. 1 include a monitor, a TV, a tablet PC, a mobile terminal, and so on.

Figure 2:
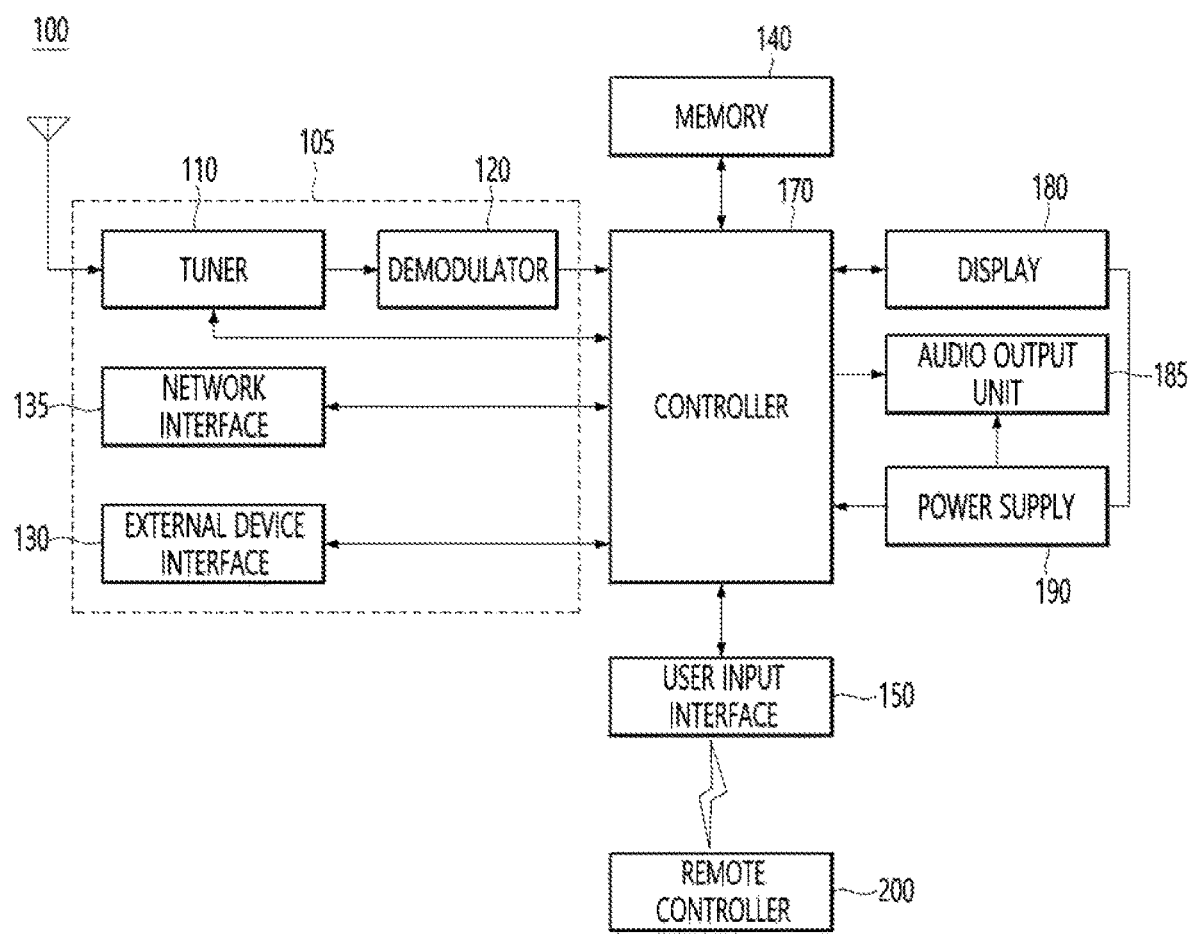
FIG. 2 is an example of a block diagram of the inside of the image display apparatus in FIG. 1.

FIG. 2 is an example of a block diagram of the inside of the image display apparatus in FIG. 1.

With reference to FIG. 2, the image display apparatus 100 according to an embodiment of the present disclosure includes a broadcast reception unit 105, an external device interface 130, a memory 140, a user input interface 150, a sensor unit (not illustrated), a controller 170, a display 180, an audio output unit 185, and a power supply unit 190.

The broadcast reception unit 105 includes a tuner unit 110, a demodulator 120, a network interface 135, and an external device interface 130.

On the other hand, unlike in the drawings, it is also possible that the broadcast reception unit 105 only includes the tuner unit 110, the demodulator 120, and the external device interface 130. That is, the network interface 135 may not be included.

The tuner unit 110 selects a radio frequency (RF) broadcast signal that corresponds to a channel which is selected by a user, or RF broadcast signals that correspond to all channels that are already stored, among RF broadcast signals that are received through an antenna (not illustrated). In addition, the selected RF broadcast signal is converted into an intermediate frequency signal, a baseband image, or an audio signal.

For example, the selected RF broadcast signal, if is a digital broadcast signal, is converted into a digital IF (DIF) signal, and, if is an analog broadcast signal, is converted into an analog baseband image or an audio signal (CVBS/SIF). That is, the tuner unit 110 processes a digital broadcast signal or an analog broadcast signal. The analog baseband image or the audio signal (CVBS/SIF) output from the tuner unit 110 is input directly into the controller 170.

On the other hand, the tuner unit 110 possibly includes a plurality of tuners in order to receive broadcast signals in a plurality of channels. In addition, it is also possible that a signal tuner that receives the broadcast signals in the plurality of channels at the same time is included.

The demodulator 120 receives a digital IF(DIF) signal that results from the conversion in the tuner unit 110 and performs a demodulation operation on the received digital IF signal.

The demodulator 120 performs demodulation and channel decoding, and then outputs a stream signal (TS). At this time, the stream signal is a signal that results from multiplexing image signals, audio signals, or data signals.

The stream signal output from the demodulator 120 is input into the controller 170. The controller 170 performs demultiplexing, video and audio signal processing, and so on, and then outputs the resulting image to the display 180 and outputs the resulting audio to the audio output unit 185.

The external device interface 130 transmits or receives data to and from an external apparatus (not illustrated) connected, for example, a set-top box. To do this, the external device interface 130 includes an A/V input and output unit (not illustrated).

The external device interface 130 is connected in a wired or wireless manner to an external apparatus, such as a digital versatile disc (DVD), a Blu-ray disc, a game device, a camera, a camcorder, a computer (a notebook computer), or a set-top box, and may perform inputting and outputting operations for reception and transmission of data to and from the external apparatus.

An image and an audio signal of the external apparatus are input into the A/V input and output unit. On the other hand, a wireless communication unit (not illustrated) performs a short-distance wireless communication with a different electronic apparatus.

Through the wireless communication unit (not illustrated), the external device interface 130 transmits and receives data to and from the nearby mobile terminal (not illustrated). Particularly, in a mirroring mode, the external device interface 130 receives device information, information on an application executed, an application image, and so on from the mobile terminal 600.

The network interface 135 provides an interface for connecting the image display apparatus 100 to wired and wireless networks including the Internet. For example, the network interface 135 receives items of content or pieces of data pieces that are provided by a content provider or a network operator through a network or the Internet.

On the other hand, the network interface 135 includes the wireless communication unit (not illustrated).

A program for controlling processing or control of each signal within the controller 170 may be stored in the memory 140. An image signal, an audio signal, or a data signal, which results from signal processing, may be stored in the memory 140.

In addition, an image signal, an audio signal, or a data signal, which is input into the external device interface 130, may be temporarily stored in the memory 140. In addition, information on a predetermined broadcast channel may be stored in the memory 140 through a channel storage function such as a channel map.

An embodiment in which the memory 140 is provided separately from the controller 170 is illustrated in FIG. 2, but the scope of the present disclosure is not limited to this. The memory 140 is included within the controller 170.

The user input interface 150 transfers a signal input by the user, to the controller 170, or transfers a signal from the controller 170 to the user.

For example, user input signals, such as power-on and -off signals, a channel selection signal, and a screen setting signal, are transmitted and received to and from a remote controller 200, user input signals that are input from local keys (not illustrated), such as a power key, a channel key, a volume key, and a setting key, are transferred to the controller 170, a user input signal input from the sensing unit (not illustrated) that senses a user's gesture is transferred to the controller 170, or a signal from the controller 170 is transmitted to the sensing unit (not illustrated).

The controller 170 demultiplexes a stream input through the tuner unit 110, the demodulator 120, the network interface 135, the external device interface 130, or processes signals that results from demultiplexing, and thus generates and outputs a signal for outputting an image and audio.

An image signal that results from image-processing in the controller 170 is input into the display 180, and an image that corresponds to the image signal is displayed. In addition, the image signal that results from the image-processing in the controller 170 is input into an external output apparatus through the external device interface 130.

An audio signal that results from processing in the controller 170 is output, as audio, to the audio output unit 185. In addition, an audio signal that results from processing in the controller 170 is input into an external output apparatus through the external device interface 130.

Although not illustrated in FIG. 2, the controller 170 includes a demultiplexer, an image processing unit, and so on. The details of this will be described below with reference to FIG. 3.

In addition, the controller 170 controls an overall operation within the image display apparatus 100. For example, the controller 170 controls the tuner unit 110 in such a manner that the tuner unit 110 performs selection of (tuning to) a RF broadcast that corresponds to a channel selected by the user or a channel already stored.

In addition, the controller 170 controls the image display apparatus 100 using a user command input through the user input interface 150, or an internal program.

On the other hand, the controller 170 controls the display 180 in such a manner that an image is displayed. At this time, the image displayed on the display 180 is a still image, or a moving image, and is a 2D image or a 3D image.

On the other hand, the controller 170 is configured to a predetermined object is displayed within the image displayed on the display 180. For example, the object is at least one of the following: a web screen (a newspaper, a magazine, or so on) connected, an electronic program guide (EPG), various menus, a widget, an icon, a still image, a moving image, and text.

On the other hand, the controller 170 recognizes a location of the user, based on an image captured by an imaging unit (not illustrated). For example, a distance (a z-axis coordinate) between the user and the image display apparatus 100 is measured. In addition, a x-axis coordinate and a y-axis coordinate within the display 180, which correspond to the location of the user are calculated.

The display 180 converts an image signal, a data signal, an OSD signal, a control signal that result from the processing in the controller 170, or an image signal, a data signal, a control signal, and so on that are received in the external device interface 130, and generates a drive signal.

On the other hand, the display 180 is configured with a touch screen, and thus is also possibly used as an input device, in addition to an output device.

The audio output unit 185 receives a signal that results from audio processing the controller 170, as an input, and outputs the signal, as audio.

The imaging unit (not illustrated) captures an image of the user. The imaging unit (not illustrated) is realized as one camera, but is not limited to the one camera. It is also possible that the image unit is realized as a plurality of cameras. Information of an image captured by the imaging unit (not illustrated) is input into the controller 170.

Based on the image captured by the imaging unit (not illustrated), or on an individual signal detected by the sensing unit (not illustrated) or a combination of the detected individual signals, the controller 170 detects the user's gesture.

A power supply unit 190 supplies required powers to the entire image display apparatus 100. Particularly, a power is supplied to the controller 170 realized in the form of a system-on-chip (SOC), the display 180 for image display, the audio output unit 185 for audio output, and so on.

Specifically, the power supply unit 190 includes a converter that converts an alternating current power into a direct current power, and a dc/dc converter that converts a level of the direct current power.

The remote controller 200 transmits a user input to the user input interface 150. To do this, the remote controller 200 employs Bluetooth, radio frequency (RF) communication, infrared (IR) communication, ultra-wideband (UWB), a ZigBee specification, and so on. In addition, the remote controller 200 receives an image signal, an audio signal, or a data signal output from the user input interface 150, and displays the received signal on a display unit of the remote controller 200 or outputs the received signal, as audio, to an output unit of the remote controller 200.

On the other hand, the image display apparatus 100 described above is a digital broadcast receiver that possibly receives a fixed-type or mobile-type digital broadcast.

On the other hand, a block diagram of the image display apparatus 100 illustrated in FIG. 2 is a block diagram for an embodiment of the present disclosure. Each constituent element in the block diagram is subject to integration, addition, or omission according to specifications of the image display apparatus 100 actually realized. That is, two or more constituent elements are to be integrated into one constituent element, or one constituent element is to be divided into two or more constituent elements. In addition, a function performed in each block is for description of an embodiment of the present disclosure, and specific operation of each constituent element imposes no limitation to the scope of the present disclosure.

Figure 3:
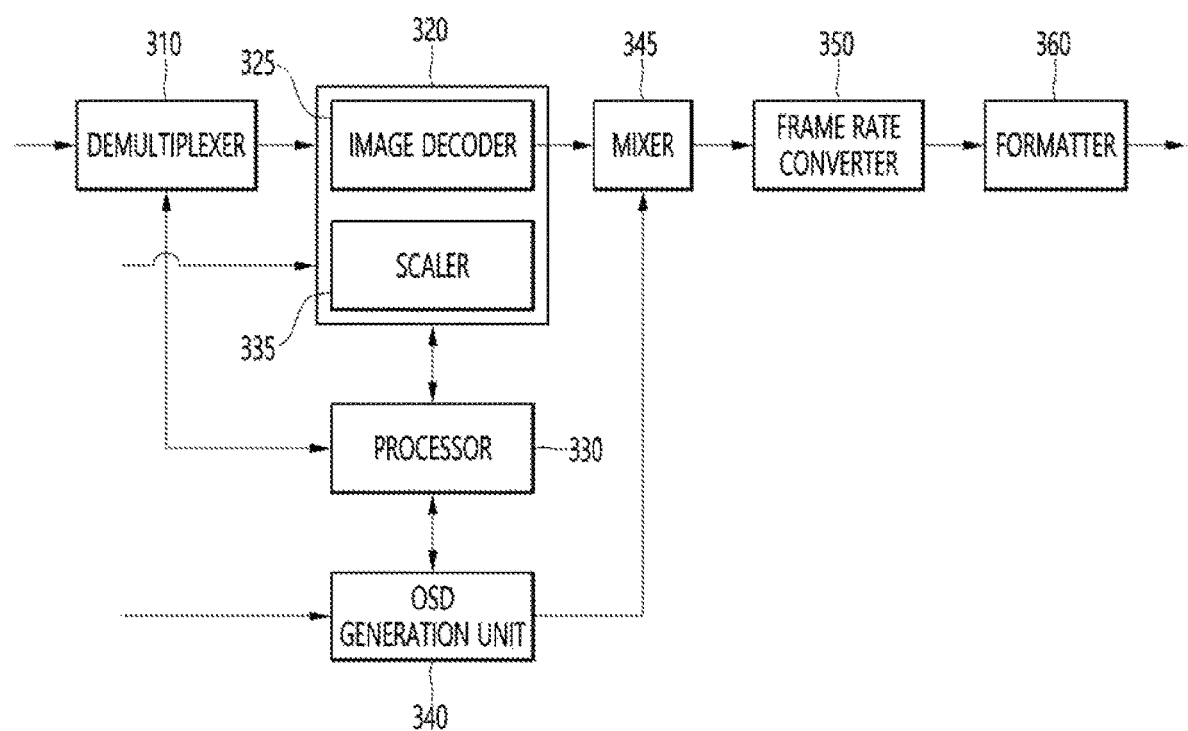
FIG. 3 is an example of a block diagram of the inside of a controller in FIG. 2.

FIG. 3 is an example of a block diagram of the inside of a controller in FIG. 2.

For description with reference to the drawings, the controller 170 according to an embodiment of the present disclosure includes a demultiplexer 310, an image processing unit 320, a processor 330, an OSD generation unit 340, a mixer 345, a frame rate converter 350, and a formatter 360. In addition, an audio processing unit (not illustrated) and a data processing unit (not illustrated) are further included.

The demultiplexer 310 demultiplexes a stream input. For example, in a case where an MPEG-2 TS is input, the MPEG-2 TS is demultiplexed into an image signal, an audio signal, and a data signal. At this point, a stream signal input into the demultiplexer 310 is a stream signal output from the tuner unit 110, the demodulator 120, or the external device interface 130.

The image processing unit 320 performs image processing of the image signal that results from the demultiplexing. To do this, the image processing unit 320 includes an image decoder 325 or a scaler 335.

The image decoder 325 decodes the image signal that results from the demultiplexing. The scaler 335 performs scaling in such a manner that a resolution of an image signal which results from the decoding is such that the image signal is possibly output to the display 180.

Examples of the image decoder 325 possibly include decoders in compliance with various specifications. For example, the examples of the image decoder 325 include a decoder for MPEG-2, a decoder for H.264, a 3D image decoder for a color image and a depth image, a decoder for a multi-point image, and so on.

The processor 330 controls an overall operation within the image display apparatus 100 or within the controller 170. For example, the processor 330 controls the tuner unit 110 in such a manner that the tuner unit 110 performs the selection of (tuning to) the RF broadcast that corresponds to the channel selected by the user or the channel already stored.

In addition, the processor 330 controls the image display apparatus 100 using the user command input through the user input interface 150, or the internal program.

In addition, the processor 330 performs control of transfer of data to and from the network interface 135 or the external device interface 130.

In addition, the processor 330 controls operation of each of the demultiplexer 310, the image processing unit 320, the OSD generation unit 340, and so on within the controller 170.

The OSD generation unit 340 generates an OSD signal, according to the user input or by itself. For example, based on the user input signal, a signal is generated for displaying various pieces of information in a graphic or text format on a screen of the display 180. The OSD signal generated includes various pieces of data for a user interface screen of the image display apparatus 100, various menu screens, a widget, an icon, and so on. In addition, the OSD generated signal includes a 2D object or a 3D object.

In addition, based on a pointing signal input from the remote controller 200, the OSD generation unit 340 generates a pointer possibly displayed on the display. Particularly, the pointer is generated in a pointing signal processing unit, and an OSD generation unit 340 includes the pointing signal processing unit (not illustrated). Of course, it is also possible that instead of being providing within the OSD generation unit 340, the pointing signal processing unit (not illustrated) is provided separately.

The mixer 345 mixes the OSD signal generated in the OSD generation unit 340, and the image signal that results from the image processing and the decoding in the image processing unit 320. An image signal that results from the mixing is provided to the frame rate converter 350.

The frame rate converter (FRC) 350 converts a frame rate of an image input. On the other hand, it is also possible that the frame rate converter 350 outputs the image, as is, without separately converting the frame rate thereof.

On the other hand, the formatter 360 converts a format of the image signal input, into a format for an image signal to be displayed on the display, and outputs an image that results from the conversion of the format thereof.

The formatter 360 changes the format of the image signal. For example, a format of a 3D image signal is changed to any one of the following various 3D formats: a side-by-side format, a top and down format, a frame sequential format, an interlaced format, and a checker box format.

On the other hand, the audio processing unit (not illustrated) within the controller 170 performs audio processing of an audio signal that results from the demultiplexing. To do this, the audio processing unit (not illustrated) includes various decoders.

In addition, the audio processing unit (not illustrated) within the controller 170 performs processing for base, treble, volume adjustment and so on.

The data processing unit (not illustrated) within the controller 170 performs data processing of a data signal that results from the demultiplexing. For example, in a case where a data signal that results from the demultiplexing is a data signal the results from coding, the data signal is decoded. The data signal that results from the coding is an electronic program guide that includes pieces of broadcast information, such as a starting time and an ending time for a broadcast program that will be telecast in each channel.

On the other hand, a block diagram of the controller 170 illustrated in FIG. 3 is a block diagram for an embodiment of the present disclosure. Each constituent element in the block diagram is subject to integration, addition, or omission according to specifications of the image display controller 170 actually realized.

Particularly, the frame rate converter 350 and the formatter 360 may be provided separately independently of each other or may be separately provided as one module, without being provided within the controller 170.

FIG. 4A is a diagram illustrating a method in which the remote controller in FIG. 2 performs control.

In FIG. 4A(a), it is illustrated that a pointer 205 which corresponds to the remote controller 200 is displayed on the display 180.

The user moves or rotates the remote controller 200 upward and downward, leftward and rightward (FIG. 4A(b)), and forward and backward (FIG. 4A(c)). The pointer 205 displayed on the display 180 of the image display apparatus corresponds to movement of the remote controller 200. As in the drawings, movement of the pointer 205, which depends on the movement of the remote controller 200 in a 3D space, is displayed and thus, the remote controller 200 is named a spatial remote controller or a 3D pointing device.

FIG. 4A(b) illustrates that, when the user moves the remote controller 200 leftward, the pointer 205 displayed on the display 180 of the image display apparatus correspondingly moves leftward.

Information on the movement of the remote controller 200, which is detected through a sensor of the remote controller 200, is transferred to the image display apparatus. The image display apparatus calculates the information on the movement of the remote controller 200 from coordinates of the pointer 205. The image display apparatus displays the pointer 205 in such a manner that the pointer 25 corresponds to the calculated coordinates.

FIG. 4A(c) illustrates a case where the user moves the remote controller 200 away from the display 180 in a state where a specific button within the remote controller 200 is held down. Accordingly, a selection area within the display 180, which corresponds to the pointer 205, is zoomed in so that the selection area is displayed in an enlarged manner. Conversely, in a case where the user causes the remote controller 200 to approach the display 180, the selection area within the display 180, which corresponds to the pointer 205, is zoomed out so that the selection is displayed in a reduced manner. On the other hand, in a case where the remote controller 200 moves away from the display 180, the selection area may be zoomed out, and in a case where the remote controller 200 approaches the display 180, the selection area may be zoomed in.

On the other hand, an upward or downward movement, or a leftward or rightward movement is not recognized in a state where a specific button within the remote controller 200 is held down. That is, in a case where the remote controller 200 moves away from or approaches the display 180, only a forward or backward movement is set to be recognized without the upward or downward movement, or the leftward or rightward movement being recognized. Only the pointer 205 moves as the remote controller 200 moves upward, downward, leftward, or rightward, in a state where a specific button within the remote controller 200 is not held down.

On the other hand, a moving speed or a moving direction of the pointer 205 corresponds to a moving speed or a moving direction of the remote controller 200, respectively.

Figure 4B:
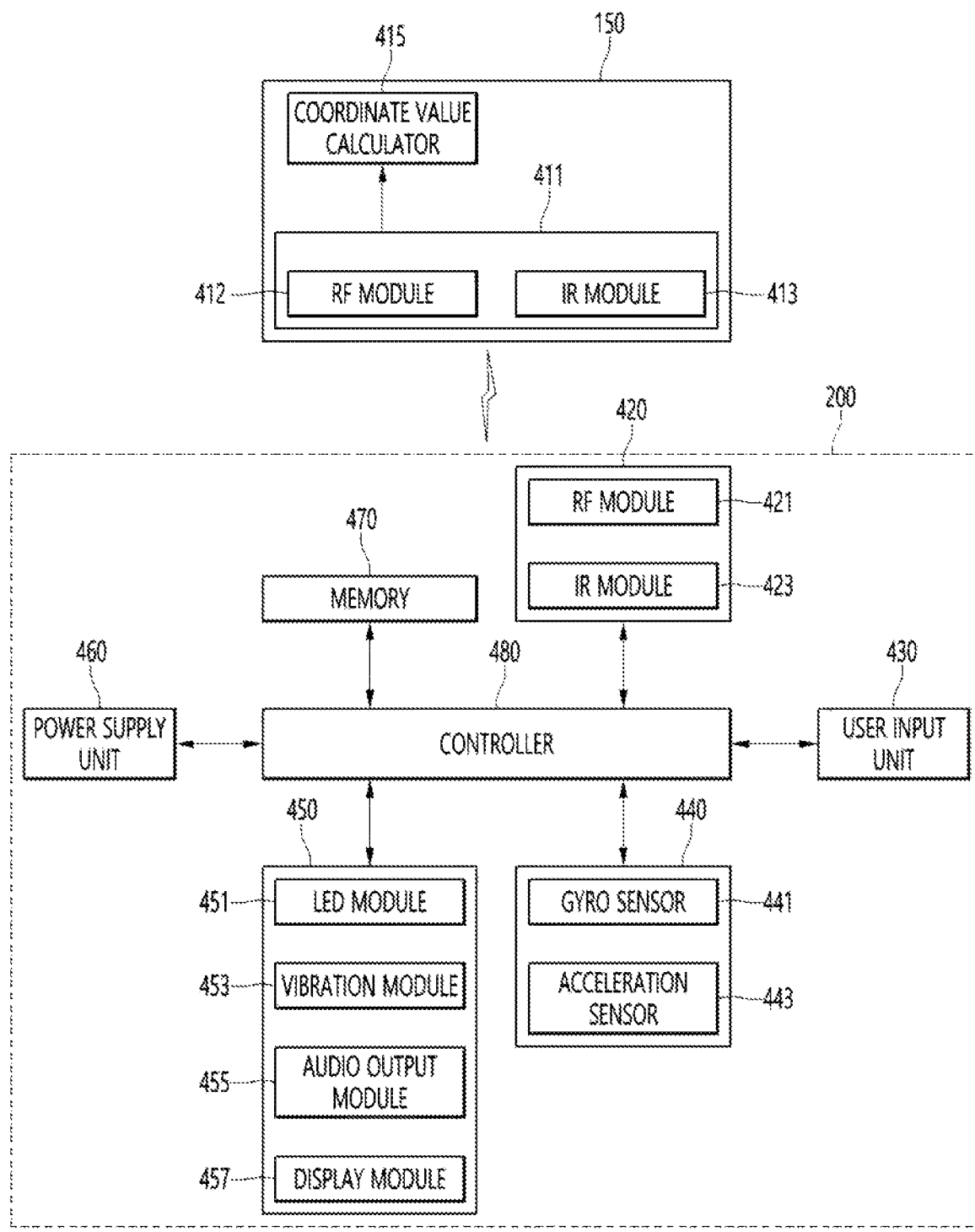
FIG. 4B is a block diagram of the inside of the remote controller in FIG. 2.

FIG. 4B is a block diagram of the inside of the remote controller in FIG. 2.

For description with reference to the drawings, the remote controller 200 includes a wireless communication unit 420, a user input unit 430, a sensor unit 440, an output unit 450, a power supply unit 460, a memory 470, and a controller 480.

The wireless communication unit 420 transmits and receives a signal to and from an arbitrary one of the image display apparatuses according to the embodiments of the present disclosure, which are described above. Of the image display apparatuses according to the embodiments of the present disclosure, one image display apparatus is taken as an example for description.

According to the present embodiment, the remote controller 200 includes an RF module 421 that transmits and receives a signal to and from the image display apparatus 100 in compliance with RF communication standards. In addition, the remote controller 200 includes an IR module 423 that possibly transmits and receives a signal to and from the image display apparatus 100 in compliance with IR communication standards.

According to the present embodiment, the remote controller 200 transfers a signal containing information on the movement of the remote controller 200 to the image display apparatus 100 through the RF module 421.

In addition, the remote controller 200 receives a signal transferred by the image display apparatus 100, through the RF module 421. In addition, the remote controller 200 transfers a command relating to power-on, power-off, a channel change, or a volume change, to the image display apparatus 100, through the IR module 423, whenever needed.

The user input unit 430 is configured with a keypad, buttons, a touch pad, a touch screen, or so on. The user inputs a command associated with the image display apparatus 100 into the remote controller 200 by operating the user input unit 430. In a case where the user input unit 430 is equipped with a physical button, the user inputs the command associated with the image display apparatus 100 into the remote controller 200 by performing an operation of pushing down the physical button. In a case where the user input unit 430 is equipped with a touch screen, the user inputs the command associated with the image display apparatus 100 into the remote controller 200 by touching on a virtual key of the touch screen. In addition, the user input unit 430 may be equipped with various types of input means operated by the user, such as a scroll key or a jog key, and the present embodiment does not impose any limitation on the scope of the present disclosure.

The sensor unit 440 includes a gyro sensor 441 or an acceleration sensor 443. The gyro sensor 441 senses information on the movement of the remote controller 200.

As an example, the gyro sensor 441 senses the information on operation of the remote controller 200 on the x-, y-, and z-axis basis. The acceleration sensor 443 senses information on the moving speed and so on of the remote controller 200. On the other hand, a distance measurement sensor is further included. Accordingly, a distance to the display 180 is sensed.

The output unit 450 outputs an image or an audio signal that corresponds to the operating of the user input unit 430 or corresponds to a signal transferred by the image display apparatus 100. Through the output unit 450, the user recognizes whether or not the user input unit 430 is operated or whether or not the image display apparatus 100 is controlled.

As an example, the output unit 450 includes an LED module 451, a vibration module 453, an audio output module 455, or a display module 457. The LED module 451, the vibration module 453, the audio output module 455, and the display module 457 emits light, generates vibration, outputs audio, or outputs an image, respectively, when the input unit 435 is operated, or a signal is transmitted and received to and from the image display apparatus 100 through a wireless communication unit 420.

The power supply unit 460 supplies a power to the remote controller 200. In a case where the remote controller 200 does not move for a predetermined time, the power supply unit 460 reduces power consumption by interrupting power supply. In a case where a predetermined key provided on the remote controller 200 is operated, the power supply unit 460 resumes the power supply.

Various types of programs, pieces of application data, and so on that are necessary for control or operation of the remote controller 200 are stored in the memory 470. In a case where the remote controller 200 transmits and receives a signal to and from the image display apparatus 100 in a wireless manner through the RF module 421, the signal is transmitted and received in a predetermined frequency band between the remote controller 200 and the image display apparatus 100. The controller 480 of the remote controller 200 stores information on, for example, a frequency band in which data is transmitted and received in a wireless manner to and from the image display apparatus 100 paired with the remote controller 200, in the memory 470, and makes a reference to the stored information.

The controller 480 controls all operations associated with the control by the remote controller 200. The controller 480 transfers a signal that corresponds to operating of a predetermined key of the user input unit 430, or a signal that corresponds to the movement of the remote controller 200, which is sensed in the sensor unit 440, to the image display apparatus 100 through the wireless communication unit 420.

A user input interface 150 of the image display apparatus 100 includes a wireless communication unit 411 that transmits and receives a signal in a wireless manner to and from the remote controller 200, and a coordinate value calculator 415 that calculates a coordinate value of the pointer, which corresponds to the operation of the remote controller 200.

The user input interface 150 transmits and receives the signal in a wireless manner to and from the remote controller 200 through the RF module 412. In addition, a signal transferred in compliance with the IR communication standards by the remote controller 200 through the IR module 413 is received.

The coordinate value calculator 415 calculates a coordinate value (x, y) of the pointer 205 to be displayed on the display 180, which results from compensating for a hand movement or an error, from a signal that corresponds to the operation of the remote controller 200, which is received through the wireless communication unit 411.

A transfer signal of the remote controller 200, which is input into the image display apparatus 100 through the user input interface 150 is transferred to the controller 170 of the image display apparatus 100. The controller 170 determines information on the operation of the remote controller 200 and information on operating of a key, from the signal transferred by the remote controller 200, and correspondingly controls the image display apparatus 100.

As another example, the remote controller 200 calculates a coordinate value of a pointer, which corresponds to the operation of the remote controller 200, and outputs the calculated value to the user input interface 150 of the image display apparatus 100. In this case, the user input interface 150 of the image display apparatus 100 transfers information on the received coordinate values of the pointer, to the controller 170, without performing a process of compensating for the hand movement and the error.

In addition, as another example, unlike in the drawings, it is also possible that the coordinate value calculator 415 is included within the controller 170 instead of the user input interface 150.

Figure 5:
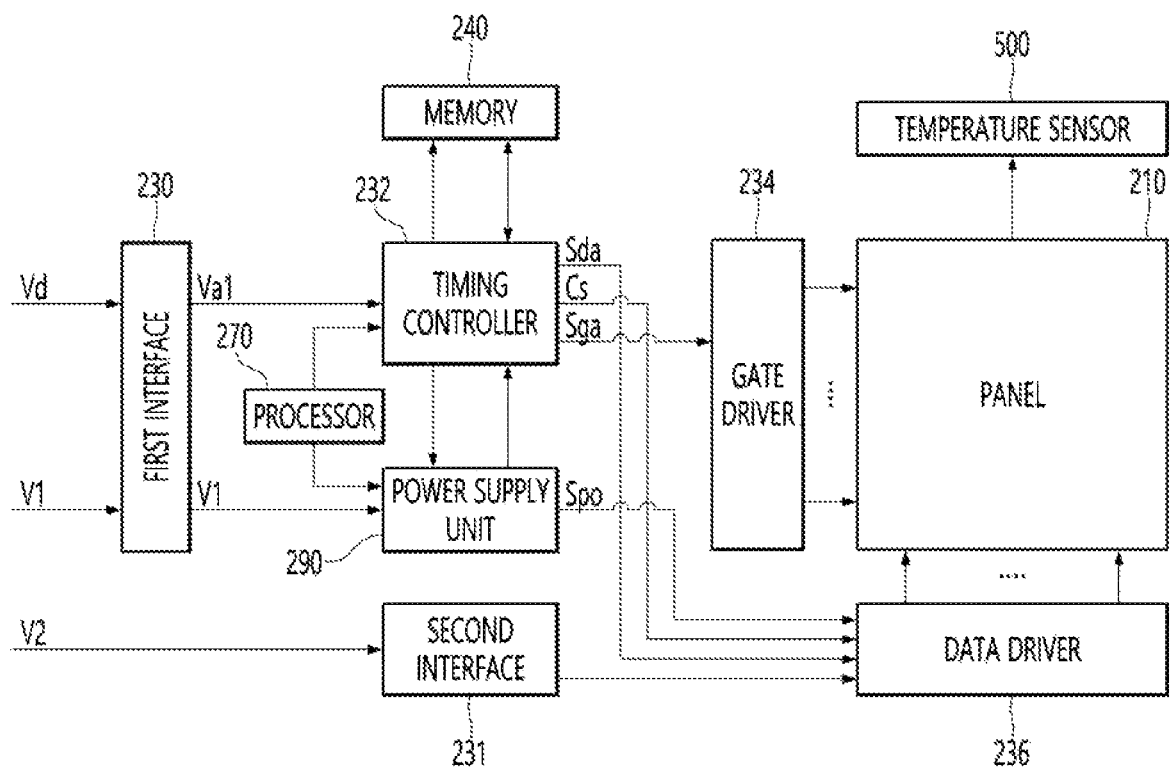
FIG. 5 is a block diagram of the inside of the display in FIG. 2.

FIG. 5 is a block diagram of the inside of the display in FIG. 2.

With reference with the drawings, the display 180 based on the organic light-emitting diode may include the OLED panel 210, a first interface 230, a second interface 231, a timing controller 232, a gate driver 234, a data driver 236, a memory 240, a processor 270, a power supply unit 290, a temperature sensor 500, and so on.

The display 180 receives an image signal Vd, a first direct current power V1, and a second direct current power V2. Based on the image signal Vd, the display 180 display a predetermined image is displayed.

On the other hand, the first interface 230 within the display 180 receives the image signal Vd and the first direct current power V1 from the controller 170.

At this point, the first direct current power V1 is used for operation for each of the power supply unit 290 and the timing controller 232 within the display 180.

Next, the second interface 231 receives the second direct current power V2 from the external power supply unit 190. On the other hand, the second direct current power V2 is input into the data driver 236 within the display 180.

Based on the image signal Vd, the timing controller 232 outputs a data drive signal Sda and a gate drive signal Sga.

For example, in a case where the first interface 230 converts the image signal Vd input, and outputs image signal va1 that results from the conversion, the timing controller 232 outputs the data drive signal Sda and the gate drive signal Sga based on the image signal va1 that results from the conversion.

The timing controller 232 further receives a control signal, the vertical synchronization signal Vsync, and so on, in addition to a video signal Vd from the controller 170.

The timing controller 232 outputs the gate drive signal Sga for operation of the gate driver 234 and the data drive signal Sda for operation of the data driver 236, based on the control signal, the vertical synchronization signal Vsync, and so on in addition to the video signal Vd.

In a case where the OLED panel 210 includes a subpixel for RGBW, the data drive signal Sda at this time is a data drive signal for a subpixel for RGBW.

On the other hand, the timing controller 232 further outputs a control signal Cs to the gate driver 234.

The gate driver 234 and the data driver 236 supplies a scanning signal and an image signal to the OLED panel 210 through a gate line GL and a data line DL according to the gate drive signal Sga and the data drive signal Sda, respectively, from the timing controller 232. Accordingly, a predetermined image is displayed on the OLED panel 210.

On the other hand, the OLED panel 210 includes an organic light-emitting layer. In order to display an image, many gate lines GL and many data lines DL are arranged to intersect each other in a matrix form, at each pixel that corresponds to the organic light-emitting layer.

On the other hand, the data driver 236 outputs a data signal to the OLED panel 210 based on the second direct current power V2 from the second interface 231.

The power supply unit 290 supplies various types of powers to the gate driver 234, the data driver 236, the timing controller 232, and so on.

The processor 270 performs various types of control within the display 180. For example, the gate driver 234, the data driver 236, the timing controller 232, and so on are controlled.

The temperature sensor 500 may be disposed inside the OLED panel 210 and may sense the temperature of the OLED panel 210.

Figure 6A:
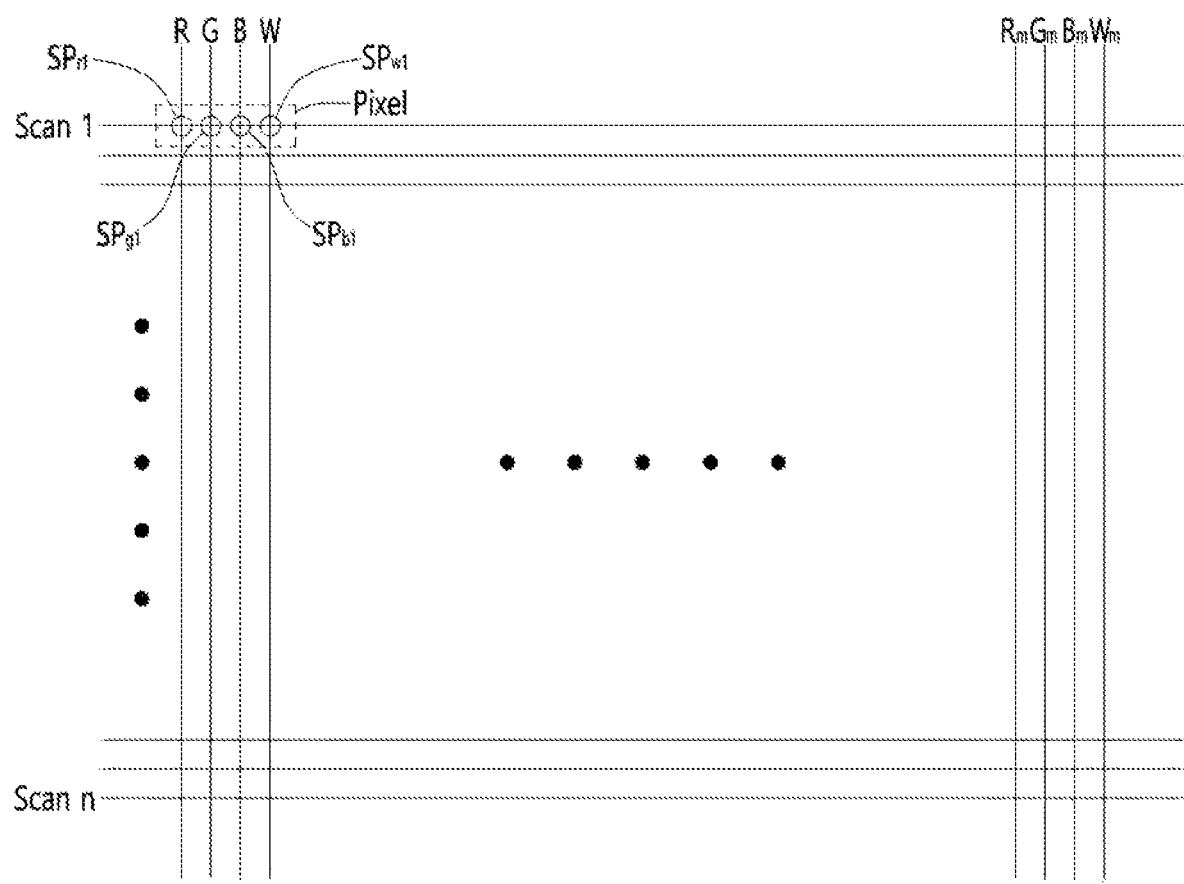
FIGS. 6A and 6B are diagrams that are referred to for description of the OLED panel in FIG. 5.
Figure 6B:
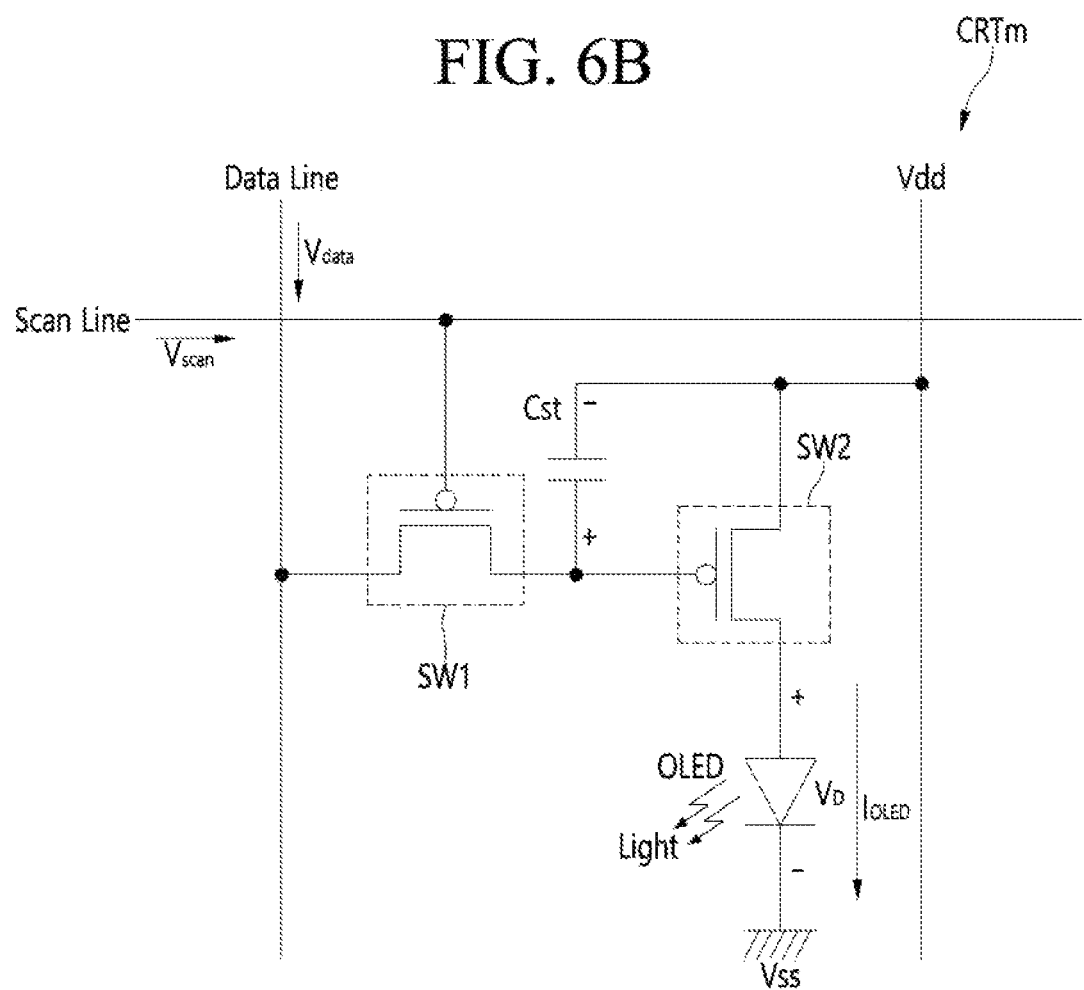

FIGS. 6A and 6B are diagrams that are referred to for description of the OLED panel in FIG. 5.

First, FIG. 6A is a diagram illustrating a pixel within the OLED panel 210.

With reference to the drawings, the OLED panel 210 includes a plurality of scan lines Scan 1 to Scan n and a plurality of data lines R1, G1, B1, W1 to Rm, Gm, Bm, Wm that intersect a plurality of scan lines Scan 1 to Scan n, respectively.

On the other hand, an area where the scan line and the data line within the OLED panel 210 intersect each other is defined as a subpixel. In the drawings, a pixel that includes a subpixel SPr1, SPg1, SPb1, SPw1 for RGBW is illustrated.

FIG. 6B illustrates a circuit of one subpixel within the OLED panel in FIG. 6A.

With reference to the drawings, an organic light-emitting subpixel circuit CRTm includes a switching element SW1, a storage capacitor Cst, a drive switching element SW2, and an organic light-emitting layer (OLED), which are active-type elements.

A scan line is connected to a gate terminal of the scan switching element SW1. The scanning switching element SW1 is turned on according to a scan signal Vscan input. In a case where the scan switching element SW1 is turned on, a data signal Vdata input is transferred to the gate terminal of the scan switching element SW2 or one terminal of the storage capacitor Cst.

The storage capacitor Cst is formed between the gate terminal and a source terminal of the drive switching element SW2. A predetermined difference between a data signal level transferred to one terminal of the storage capacitor Cst and a direct current (Vdd) level transferred to the other terminal of the storage capacitor Cst is stored in the storage capacitor Cst.

For example, in a case where data signals have different levels according to a pulse amplitude modulation (PAM) scheme, power levels that are stored in the storage capacitor Cst are different according to a difference between levels of data signals Vdata.

As another example, in a case where data signals have different pulse widths according to a pulse width modulation (PWM) scheme, power levels that are stored in the storage capacitor Cst are different according to a difference between pulse widths of data signals Vdata.

The drive switching element SW2 is turned on according to the power level stored in the storage capacitor Cst. In a case where the drive switching element SW2 is turned on, a drive electric current (IOLED), which is in proportion to the stored power level, flows through the organic light-emitting layer (OLED). Accordingly, the organic light-emitting layer (OLED) performs a light-emitting operation.

The organic light-emitting layer (OLED) includes a light-emitting layer (EML) for RGBW, which corresponds to a subpixel, and includes at least one of the following layers: a hole implementation layer (HIL), a hole transportation layer (HTL), an electron transportation layer (ETL), and an electron implementation layer (EIL). In addition to these, the organic light-emitting layer includes a hole support layer and so on.

On the other hand, when it comes to a subpixel, the organic light-emitting layer outputs while light, but in the case of the subpixels for green, red, and blue, a separate color filter is provided in order to realize color. That is, in the case of the subpixels for green, red, and blue, color filters for green, red, and blue, respectively, are further provided. On the other hand, in the case of the subpixel for white, white light is output and thus a separate color filter is unnecessary.

On the other hand, in the drawings, as the scan switching element SW1 and the drive switching element SW2, p-type MOSFETs are illustrated, but it is also possible that n-type MOSFETs, or switching elements, such as JETs, IGBTs, or SICs, are used.

Meanwhile, the controller 170 may perform an automatic current limit (ACL) function to control the maximum value of a current supplied to the OLED panel 210 to a current limit value or smaller.

When the ACL function is performed, the controller 170 may perform a manner of determining an average picture level (APL) of the OLED panel 210 by adding up total data values for displaying an image on the OLED panel 210, adjusting a light emitting duration depending on the APL, and controlling the driving current of the OLED panel 210 by changing image data, thereby reducing the whole brightness of the screen.

As described above, the ACL function may prevent the temperature of the display 180 from being excessively increased, as the higher driving current is supplied to the OLED panel 210.

Meanwhile, the ACL function has a limitation in reducing the temperature of the OLED panel 210, when the external temperature is excessively high. For example, when the external temperature is 25° C., the ACL function may reduce the temperature of the OLED panel 210, which is overheated to 50° C., to 35° C. within a specific time. However, when the external temperature is 45° C., the ACL function may not reduce the temperature of the OLED panel 210, which is overheated to 50° C., to 35° C. or less.

Accordingly, the present disclosure is to provide an OLED display device capable of minimizing the temperature increase of the OLED panel 210, based on the external temperature.

Figure 7:
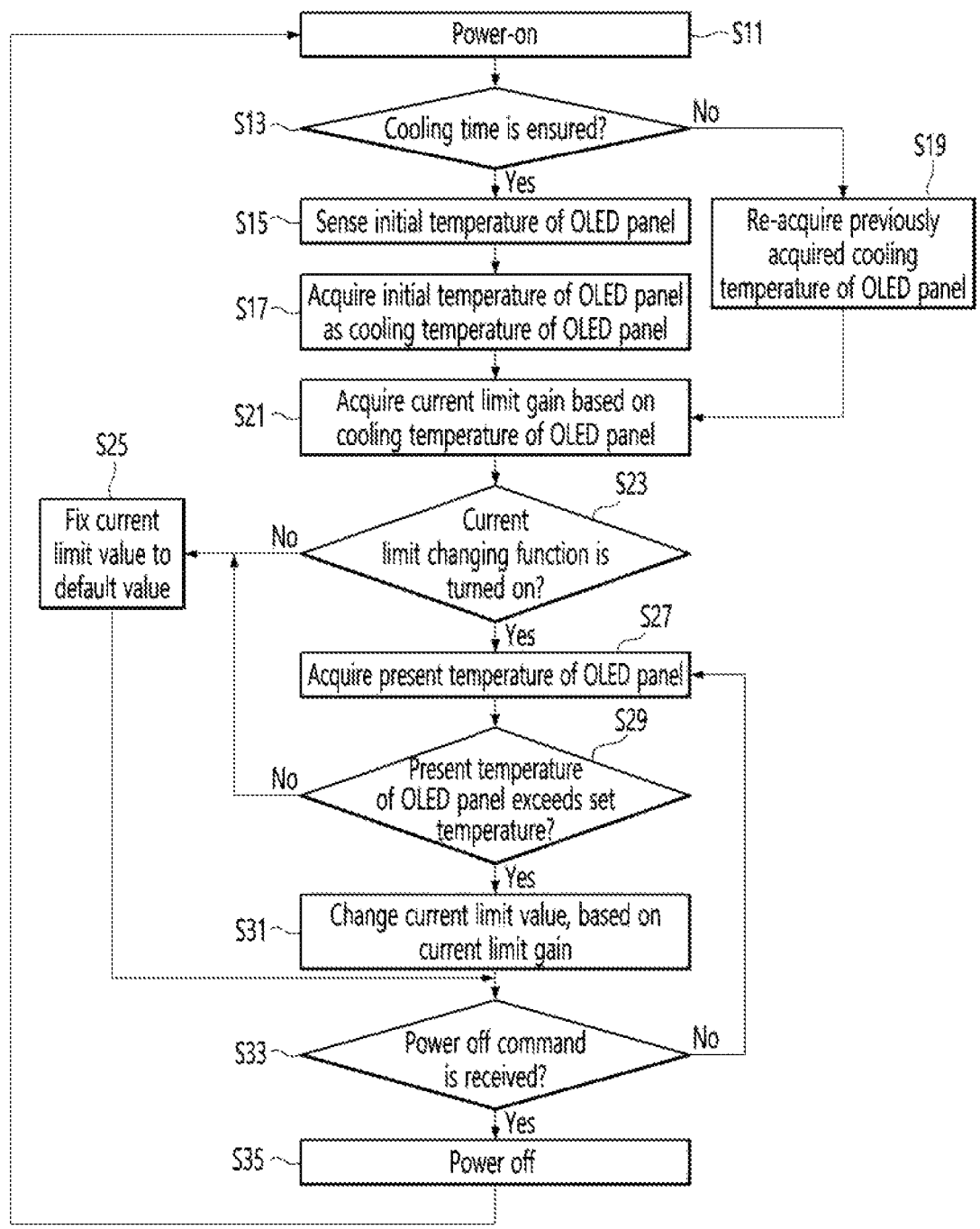
FIG. 7 is a flowchart illustrating a method for operating an OLED display device according to an embodiment of the present disclosure.

FIG. 7 is a flowchart illustrating a method for operating an OLED display device according to an embodiment of the present disclosure.

The controller 170 may sense the power-on of the OLED display device (S11).

The OLED display device may be powered off, when receiving an input signal for power-off from the remote controller 200 or when a power line is disconnected from an outlet.

The OLED display device may be powered on, when receiving an input signal for power on from the remote controller 200 in the state that the power line is connected with the outlet.

The controller 170 may acquire whether a cooling time is ensured, when the power-on is sensed (S13).

The cooling time may refer to a time for which the OLED panel 210 should be turned off for a specific time or more to compensate for an afterimage. In other words, the cooling time may refer to a specific time for which the power-off of the OLED display device should be maintained. For example, the cooling time may be 55 minutes, which is provided for the illustrative purpose, but the present disclosure is not limited thereto. In other words, according to an embodiment, the cooling time may be two hours.

The controller 170 may acquire whether the cooling time is ensured, by measuring a power-off time.

For example, when the power line is disconnected from the outlet, the controller 170 may measure the power-off time through a discharge circuit (not illustrated). In other words, when the supply of AC power is cut off, the controller 170 may measure the power-off time through the discharge circuit (not illustrated).

In addition, when the power line is connected with an outlet, since only the supply of DC power is cut off, and AC power is supplied, the controller 170 may measure the power-off time without the discharge circuit (not illustrated).

Meanwhile, the above-described manner of measuring the power-off time is provided only for the illustrative purpose, and the controller 170 may measure the power-off time in various manners.

The controller 170 may determine that the cooling time is ensured, when the power-off time is equal to or greater than the cooling time, and may not determine that the cooling time is ensured, when the power-off time is less than the cooling time.

The controller 170 may sense an initial temperature of the OLED panel 210 (S15) when the cooling time is ensured, and may acquire the initial temperature as the cooling temperature of the OLED panel 210 (S17).

When the cooling time is ensured, the temperature of the OLED panel 210 may be determined only by the external environment. In other words, heat emitted by a current supplied to the OLED panel 210 may be almost removed during the cooling time. Accordingly, the controller 170 may estimate the temperature of the OLED panel 210 as the external temperature, after the cooling time is elapsed. The external temperature may be a temperature of a surrounding place in which the OLED display device is installed.

The initial temperature of the OLED panel 210 may refer to a temperature of the OLED panel 210, which is sensed within a specific time (for example, 2 seconds) after the cooling time is ensured and the power is turned on.

When the cooling time is determined as being ensured, the controller 170 may control the temperature sensor 500 to sense the initial temperature of the OLED panel 210, and may acquire, as the cooling temperature of the OLED panel 210, the initial temperature of the OLED panel 210 sensed by the temperature sensor 500.

The cooling temperature of the OLED panel 210 may refer to the temperature of the OLED panel 210 sensed in the state that the cooling time is ensured. The cooling temperature of the OLED panel 210 may be an index indicating the external temperature. The cooling temperature of the OLED panel 210 may include the initial temperature of the OLED panel 210. The controller 170 may acquire the temperature of the OLED panel 210, which is sensed by the temperature sensor 500, as the cooling temperature, when the power-off is changed to the power-on.

Meanwhile, when the cooling time is not ensured, the controller 170 may re-acquire the previously acquired cooling temperature of the OLED panel 210 (S19).

When the cooling time is not ensured, the OLED panel 210 may have residual heat, which is generated due to the current received in the power-on status therebefore, as well as an external environment. In other words, when the cooling time is not ensured, the temperature of the OLED panel 210 may be determined by heat when is generated due to the driving of the OLED panel 210, as well as the external environment. Accordingly, the controller 170 may not estimate the temperature of the OLED panel 210, which is not subject to the cooling time, as the external temperature.

In this case, the controller 170 may re-acquire the cooling temperature of the OLED panel 210, which is previously acquired.

When the cooling temperature of the OLED panel 210 is acquired, the controller 170 may store the acquired cooling temperature of the OLED panel 210 in the memory 140.

As described above, the cooling temperature of the OLED panel 210 is stored in the memory 140, thereby preventing the acquisition of the cooling temperature of the OLED panel 210 from being failed, when the cooling time is not ensured.

When the cooling temperature of the OLED panel 210 has been already stored in the memory 140, the controller 170 may update the cooling temperature of the OLED panel 210, which has been already stored, with the cooling temperature of the OLED panel 210 which is the most lastly acquired.

As described above, the cooling temperature of the OLED panel 210 stored in the memory 140 is updated, such that the change of the external temperature resulting from the change of the eternal environment may be more rapidly recognized. Accordingly, the reliability for preventing the temperature increase of the OLED panel due to the external environment may be ensured.

As described above, the controller 170 may acquire the cooling temperature of the OLED panel 210 through the temperature sensor 500 or the memory 140. In summary, the controller 170 updates the cooling temperature with the temperature of the OLED panel 210, which is sensed by the temperature sensor 500 right after the power-off is changed to the power-on, when the cooling time is ensured as the power-off time is the specific time or more before the power-off is changed to the power-on. In addition, when the cooling time is not ensured as the power-off time is less than the specific time before the power-off time is changed to the power-on, the cooling temperature may be maintained to the previously-acquired cooling temperature.

The controller 170 may acquire a current limit gain based on the cooling temperature of the OLED panel 210 (S21).

The current limit gain may refer to a weight applied to adjust the maximum value of the current when the current is automatically limited. The current limit gain may be differently applied depending on the cooling temperature of the OLED panel 210.

The memory 140 may store a look-up table in which the cooling temperature of the OLED panel 210 is mapped to the current limit gain. The controller 170 may extract the current limit gain mapped to the OLED panel 210 from the look-up table, thereby obtaining the current limit gain.

FIG. 8 is a view illustrating a look-up table in which an initial temperature of an OLED panel is mapped to a current limit gain according to an embodiment of the present disclosure.

An initial temperature (T_I) illustrated in FIG. 8 may refer to a cooling temperature of the OLED panel 210. Referring to FIG. 8, the look-up table may include data obtained by mapping the current limit gain of 0.85 when the initial temperature (T_I) is greater than 35° C., data obtained by mapping the current limit gain of 0.9 when the initial temperature (T_I) is more than 30° C. and equal to or lower than 35° C., data obtained by mapping the current limit gain of 0.95 when the initial temperature (T_I) is greater than 25° C. and is equal to or lower than 30° C., and data obtained by mapping the current limit gain of 1, when the initial temperature (T_I) is equal to or lower than 25° C.

However, the look-up table illustrated in FIG. 8 is provided for the illustrative purpose, and the present disclosure is not limited thereto. In other words, the memory 140 may store various look-up tables including at least one piece data obtained by mapping the cooling temperature of the OLED panel 210 to the current limit gain.

The look-up table may include data obtained by mapping a current limit gain, such that a current limit value, which is the maximum value of a current in the ACL function, is set to a smaller value as the cooling temperature of the OLED panel 210 represents a higher value.

Referring to the example illustrated in FIG. 8, in the look-up table, the smaller current limit gain may be mapped, as the cooling temperature of the organic light emitting panel 210 represents a higher value, and the controller 170 may set the current limit value by multiplying the specific current value by the current limit gain. In this case, the controller 170 may set the current limit value to a smaller value, as the cooling temperature of the OLED panel 210 represents a higher value.

Hereinafter, the description will be made again with reference to FIG. 7.

The controller 170 may acquire whether a current limit changing function is turned on (S23).

A user may turn on/off the current limit changing function. The controller 170 may receive whether the current limit changing function is set, through the user input interface 150.

The current limit changing function is to set whether to change the current limit value, depending on the external temperature.

The current limit value may refer to the maximum value of a current flowing through the OLED panel 210 when the ACL function is performed. In other words, when the ACL function is performed, the current flowing through the OLED panel 210 may be limited to the current limit value or smaller.

The controller 170 may perform a control operation such that the current limit value is changed depending on the external temperature, when the current limit changing function is turned on. When the current limit changing function is turned off, the controller 170 may perform the control operation such that the current limit value is fixed regardless of the external temperature.

The controller 170 may fix the current limit value to a default value, when determining the current limit changing function as being turned off (S25).

The default value may be a value previously stored to be set as the current limit value, when the current limit changing function is turned off. For example, the default value may be 14.5 A, which is provided only for the illustrative purpose, and the present disclosure is not limited thereto.

The controller 170 may perform a control operation such that the current limit value is changed depending on the present temperature of the OLED panel 210, when the current limit changing function is determined as being turned on.

Hereinafter, a method for controlling the current limit value depending on the present temperature of the OLED panel 210 will be described in detail.

First, the controller 170 may acquire the present temperature of the OLED panel 210 (S27).

The controller 170 may control the temperature sensor 500 to sense the present temperature of the OLED panel 210.

According to an embodiment, the present temperature of the OLED panel 210 may refer to an average temperature of the OLED panel 210 which is sensed by the temperature sensor 500 for a set time.

According to another embodiment, the present temperature of the OLED panel 210 may refer to an real-time temperature of the OLED panel 210 which is sensed by the temperature sensor 500 at a current time point.

The controller 170 may acquire whether the present temperature of the OLED panel 210 exceeds the set temperature (S29).

The controller 170 may determine whether the present temperature of the OLED panel 210 exceeds the set temperature by comparing the present temperature of the OLED panel 210 with the set temperature.

For example, the set temperature may be 50° C. In this case, the OLED panel 210 may operate normally in the range of 10 to 40° C. However, since these temperature values are merely provided only for the illustrative purpose, and the present disclosure is not limited thereto.

The controller 170 may not change the current limit value, when the present temperature of the OLED panel 210 is equal to or lower than the set temperature. The controller 170 may maintain the current limit value to the default value, when the present temperature of the OLED panel 210 is equal to or lower than the set temperature.

In addition, the controller 170 may continuously acquire the present temperature of the OLED panel 210, when the present temperature of the OLED panel 210 is equal to or lower than the set temperature. In other words, the controller 170 may periodically acquire the present temperature of the OLED panel 210.

The default value has been described above, so the duplicated description thereof will be omitted.

Meanwhile, the default value may be a first current value. In this case, the controller 170 may set the current limit value to the first current value, when the present temperature of the OLED panel 210 is equal to or lower than the set temperature. The first current value will be described in detail with reference to FIG. 10 below.

When the present temperature of the OLED panel 210 is equal to or lower than the set temperature, the controller 170 may determine the OLED panel 210 as being normally operable since the OLED panel 210 is not overheated. Accordingly, in this case, the controller 170 may minimize that the brightness of an image is reduced, since the current limit value is not changed.

Meanwhile, the controller 170 may change the current limit value based on the current limit gain, when the present temperature of the OLED panel 210 exceeds the set temperature (S31).

The controller 170 may change the current limit value of the OLED panel 210, when the present temperature of the OLED panel 210 exceeds the set temperature. In detail, the controller 170 may reduce the current limit value of the OLED panel 210, when the present temperature of the OLED panel 210 exceeds the set temperature.

In other words, on the assumption that the controller 170 sets the current limit value to the first current value since the present temperature is equal to or lower than the set temperature, the controller 170 may set the current limit value to a value smaller than the first current value, when the present temperature exceeds the set temperature.

Hereinafter, a manner for setting the current limit value will be described.

According to an embodiment, the controller 170 may differently set the current limit value depending on the cooling temperature of the OLED panel 210, when the present temperature of the OLED panel 210 exceeds the set temperature.

In detail, the controller 170 may change a value, which is obtained by multiplying a specific current value by a current limit gain acquired depending on the cooling temperature, as the current limit value. For example, the specific current value may be fixed to 10A, and may be changed depending on settings.

The current limit gain may be '1' when the cooling temperature is equal to or lower than a first temperature (for example, 25° C.), may be '0.95', when the cooling temperature exceeds the first temperature (for example, 25° C.) and is equal to or lower than a second temperature (for example, 30° C.), may be '0.9' when the cooling temperature exceeds the second temperature (for example, 30° C.) and is equal to or lower than a third temperature (for example, 35° C.), and may be '0.85' when the cooling temperature exceeds the third temperature (for example, 35° C.) The current limit gain may be a value acquired in step S21.

Accordingly, the controller 170 may change the current limit value to 10 A, which is the second current value smaller than the first current value, when the current limit gain 1. In addition, the controller 170 may change the current limit value to 9.5 A, which is the third current value smaller than the second current value, when the current limit gain 0.95. In addition, the controller 170 may change the current limit value to 9 A, which is the fourth current value smaller than the third current value, when the current limit gain 0.9. In addition, the controller 170 may change the current limit value to 8.5 A, which is the fifth current value smaller than the fourth current value, when the current limit gain 0.85.

However, the manner for changing the above-described value and the current limit value is provided for the illustrative purpose, and the present disclosure is not limited thereto.

The controller 170 may acquire whether a power off command is received, after the current limit value is changed (S33).

The controller 170 may acquire the present temperature of the OLED panel 210, when the power off command is not received. In other words, the controller 170 may periodically acquire the present temperature of the OLED panel 210 and may continuously change the current limit value depending on the present temperature of the OLED panel 210, until the power off command is received.

For example, the controller 170 may reduce the current limit value when the present temperature of the OLED panel 210 exceeds the set temperature. Thereafter, the controller 170 may change the current limit value to the default value again, when a present temperature of the OLED panel 210, which is measured again, is lower than the set temperature.

For example, the controller 170 may change the current limit value to a current value (any one of the second current value to the fourth current value) smaller than the first current value, based on the current limit gain when the present temperature exceeds the set temperature. When the present temperature is re-sensed to the set temperature or lower, the controller 170 may re-change the current limit value to the first current value.

In this case, according to an embodiment, the controller 170 may instantly re-change the current limit value to the first current value, as the present temperature is re-sensed to be the set temperature or lower.

However, according to another embodiment, the controller 170 may re-change the current limit value to the first current value, when the present temperature is maintained to the set temperature or lower for a specific time (for example, 10 minutes). In this case, when the present temperature is reduced to the set temperature or lower for a short time, returning of the current limit value is minimized. Accordingly, the number of times of changing the current limit value may be minimized, and the temperature of the OLED panel 210 may be reduced.

Meanwhile, the controller 170 may maintain the current limit gain regardless of whether the current limit value is changed. In other words, the current limit gain may be changed as the OLED display device is powered off and then powered on again. When the power is maintained to be turned on, the current limit gain may be fixed.

The controller 170 may turn off power, when the power off command is received (S35).

The controller 170 may perform the above-described operation again, when the power is turned off and turned on.

Figure 9:
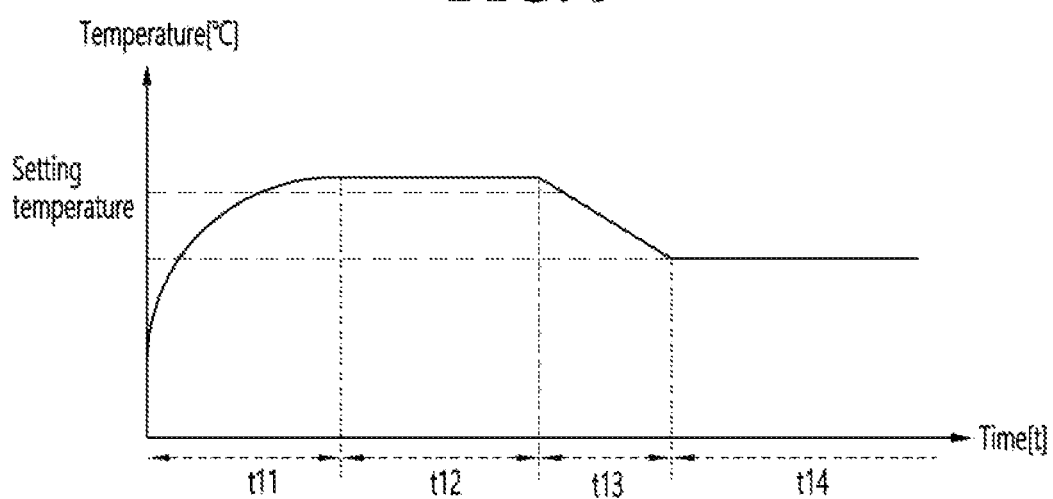
FIG. 9 is a graph illustrating the change in a present temperature of an OLED panel in an OLED display device according to an embodiment of the present disclosure.
Figure 10:
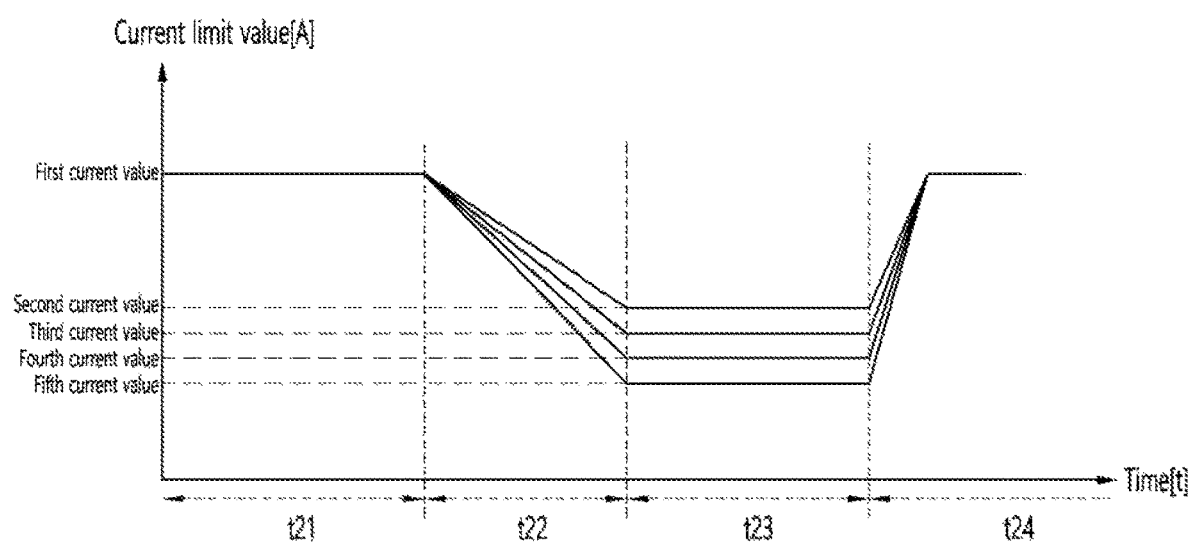
FIG. 10 is a graph illustrating the change in a current limit value of an OLED display device according to an embodiment of the present disclosure.

FIG. 9 is a graph illustrating the change in a present temperature of an OLED panel in an OLED display device according to an embodiment of the present disclosure. FIG. 10 is a graph illustrating the change in a current limit value of an OLED display device according to an embodiment of the present disclosure.

A duration t11 may be a duration in which a specific time is elapsed after the OLED display device is powered on.

The controller 170 may sense an initial temperature of the OLED panel 210 right after the duration t11 is started, may acquire the cooling temperature of the OLED panel 210, and may acquire the current limit gain based on the cooling temperature of the OLED panel 210.

Referring to the duration t11, it may be recognized that the temperature of the OLED panel 210 is increased, since a current is supplied to the OLED panel 210 as the OLED display device is powered on. In addition, the present temperature of the OLED panel 210 may exceed the set temperature at the specific time point.

According to an embodiment, in the duration t11, when the present temperature of the OLED panel 210 exceeds the set temperature, the controller 170 may change the current limit value as illustrated in FIG. 7.

Meanwhile, according to another embodiment, in the duration t11, when the present temperature of the OLED panel 210 exceeds the set temperature, the controller 170 may not change the current limit value, which is different from the description made with reference to FIG. 7. In detail, the controller 170 may further include determining whether the specific time is elapsed, between step S23 and step S27 of FIG. 7. In this case, the controller 170 may change the current limit value only when the specific time is elapsed. When the specific time is not elapsed, the controller 170 may perform a control operation such that the current limit value is not changed, even if the present temperature of the OLED panel 210 exceeds the set temperature.

As described above, the current limit value may be changed only when the specific time is elapsed after the power on. This is because it is unnecessary to change the current limit value in the situation that the temperature of the OLED panel 210 exceeds the set temperature for a short time under a specific condition even though the temperature of the OLED panel 210 is not excessively increased as a long time is not elapsed from the power-on. In this case, the duration t11 may be a duration in which the temperature of the OLED panel 210 is saturated.

A duration t12 may be a duration in which the present temperature of the OLED panel 210 is detected. In other words, the controller 170 may periodically detect the present temperature of the OLED panel 210.

The controller 263 may maintain the duration t12, when the present temperature of the OLED panel 210 is lower than the set temperature. In other words, the duration t12 may be a duration in which the present temperature of the OLED panel 210 is lower than the set temperature.

A duration t13 may be a duration in which the temperature of the OLED panel 210 is reduced by limiting a current supplied to the OLED panel 210. In particular, the duration t13 may be a duration in which the temperature of the OLED panel 210 is more sharply reduced by the reduced current limit value.

The duration t13 may start when the present temperature of the OLED panel 210 exceeds the set temperature in the duration t12. The current limit value in the duration t13 may be smaller than the current limit value in the duration t12. In addition, the current limit value in the duration t13 may be determined by the cooling temperature of the OLED panel 210, which is acquired when the duration t11 starts.

A duration t14 may be a duration in which the present temperature of the OLED panel 210 is detected after the temperature of the OLED panel 210 is reduced by the reduced current limit value in the duration t13. The temperature in the duration t14 may be maintained to be lower, more reduced, may be increased as illustrated in FIG. 9.

The controller 170 may periodically sense the present temperature of the OLED panel 210 and compare the present temperature with the set temperature even in the duration t14.

The current limit value in the duration t11 and the duration t12 may be the first current value. In other words, the duration t21 of FIG. 10 shows a current limit value shown for the duration corresponding to the sum of the duration t11 and the duration t12.

Meanwhile, a duration t22 and a duration t23 of FIG. 10 may show a current limit value for the duration t13 of FIG. 9.

The current limit value in the duration t22 and the duration t23 of FIG. 10 may be changed to be smaller than the current limit value in the duration t21 of FIG. 10. The duration t22 may be a duration in which the current limit value is gradually decreased to have a predetermined slope, and the duration t23 may be a duration in which the reduced current limit value is maintained.

In the duration t22 and the duration t23, the current limit value may decrease differently depending on the current limit gain.

In detail, as the cooling temperature of the OLED panel 210 sensed in the section t11 of FIG. 9 is increased, the current limit value is changed to be smaller. When the cooling temperature of the OLED panel 210 is 25° C. or lower, the current limit value is changed to 10 A. When the cooling temperature of the OLED panel 210 exceeds 25° C. and is equal to or lower than 30° C., the current limit value is changed to 9.5 A. When the cooling temperature of the OLED panel 210 exceeds 30° C. and is equal to or lower than 35° C., the current limit value is changed to 9 A. When the cooling temperature of the OLED panel 210 exceeds 35° C., the current limit value may be changed 8.5 A.

The duration t24 may be a duration in which the reduced current limit value is changed to a default value. In other words, when the present temperature of the OLED panel 210 is higher than the set temperature, as the current limit value is reduced in the duration t22 and the duration t23, the reduced current limit value may be returned to the first current value.

Meanwhile, the duration t24 may show a current limit value for the duration t14 of FIG. 9.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. An organic light emitting diode (OLED) display device comprising:
an OLED panel;
a power supply configured to supply a current to the OLED panel;
a controller configured to control a maximum value of the current, which is supplied to the OLED panel, to be a current limit value or smaller; and
a temperature sensor configured to sense a temperature of the OLED panel,
wherein the controller is configured to:
change the current limit value depending on the temperature of the OLED panel;
determine whether a cooling time is ensured when the OLED display device is powered on;
acquire a cooling temperature that includes a temperature of the OLED panel, which is sensed by the temperature sensor when the OLED display device is powered on after being powered off for a specific time, based on determining that the cooling time is ensured;
re-acquire a previously acquired cooling temperature as the cooling temperature, based on determining that the cooling time is not ensured; and
set the current limit value to a different value depending on the cooling temperature.

2. The OLED display device of claim 1, wherein the controller is configured to:
change the current limit value, when the temperature exceeds a set temperature.

3. The OLED display device of claim 2, wherein the controller is configured to:
set the current limit value to a first current value, when the temperature is equal to or lower than the set temperature, and
set the current limit value to a current value smaller than the first current value, when the temperature exceeds the set temperature.

4. The OLED display device of claim 1, wherein the controller is configured to:
set the current limit value to be smaller, as the cooling temperature is increased.

5. The OLED display device of claim 1, wherein the controller is configured to:
set the current limit value to a first current, when the temperature is equal to or lower than a set temperature;
set the current limit value to a second current value smaller than the first current value, when the temperature exceeds the set temperature and when the cooling temperature is equal to or lower than a first temperature; and
set the current limit value to be a third current value smaller than the second current value, when the temperature exceeds the set temperature and when the cooling temperature exceeds the first temperature.

6. The OLED display device of claim 1, wherein the controller is configured to:
acquire, as the cooling temperature, a temperature of the OLED panel, which is sensed by the temperature sensor when a status of the power is changed to the on status from an off status.

7. The OLED display device of claim of claim 6, wherein the controller is configured to:
update the cooling temperature with a temperature of the OLED panel, which is sensed by the temperature sensor right after the status of the power is changed to the on status, when the status of the power is the off status for a specific time or more before the status of the power is the on status; and
maintain the cooling temperature to a cooling temperature, which is previously obtained, when the status of the power is the off status for less than the specific time before the status of the power is changed to the on status.

8. The OLED display device of claim 1, wherein the temperature of the OLED panel includes an average temperature of the OLED panel, which is sensed by the temperature sensor for a predetermined time.

9. The OLED display device of claim 1, wherein the controller is configured to:
acquire a current limit gain based on the cooling temperature of the OLED panel; and
set the current limit value based on the current limit gain.

10. The OLED display device of claim 9, wherein the controller is configured to:
change the current limit value to a current value smaller than a first current value based on the current limit gain, when the temperature exceeds a set temperature; and
re-change the current limit value to the first current value, when the temperature is re-sensed to a temperature equal to or lower than the set temperature.

11. The OLED display device of claim 9, wherein the controller is configured to:
maintain the current limit gain regardless of whether the current limit value is changed.

12. The OLED display device of claim 1, further comprising:
a user input interface configured to receive whether a current limit changing function is set,
wherein the controller is configured to:
change the current limit value based on the temperature of the OLED panel when the current limit changing function is turned on.

13. The OLED display device of claim 12, wherein the controller is configured to:
fix the current limit value regardless of the temperature, when the current limit changing function is turned off.

* * * * *